United States Patent
Roche

(10) Patent No.: US 11,052,698 B2
(45) Date of Patent: *Jul. 6, 2021

(54) METHOD OF LAMINATING MULTI LAYER STRUCTURE TOGETHER IN A ROLL-TO-ROLL PROCESS TO MAKE A PRE-LAMINATION THAT MAY BE USED IN THE MAKING OF CREDIT AND GIFT CARDS AND MIRROR IMAGE VARIATIONS THEREOF

(71) Applicant: Griff and Associates, L.P., Fallsington, PA (US)

(72) Inventor: Timothy Roche, Bristol, PA (US)

(73) Assignee: GRIFF AND ASSOCIATES, L.P., Fallsington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,146

(22) Filed: Apr. 9, 2019

(65) Prior Publication Data

US 2019/0232712 A1    Aug. 1, 2019

Related U.S. Application Data

(63) Continuation of application No. 15/597,952, filed on May 17, 2017, now Pat. No. 10,427,447.

(60) Provisional application No. 62/483,490, filed on Apr. 10, 2017, provisional application No. 62/337,756, filed on May 17, 2016.

(51) Int. Cl.
*B42D 25/46* (2014.01)
*B32B 27/00* (2006.01)
*B32B 37/00* (2006.01)
*B32B 37/14* (2006.01)
*B32B 38/06* (2006.01)
*B42D 25/20* (2014.01)
*B42D 25/328* (2014.01)
(Continued)

(52) U.S. Cl.
CPC .............. *B42D 25/46* (2014.10); *B32B 27/00* (2013.01); *B32B 37/0015* (2013.01); *B32B 37/144* (2013.01); *B32B 38/06* (2013.01); *B32B 2425/00* (2013.01); *B42D 25/285* (2014.10); *B42D 25/328* (2014.10); *B42D 25/36* (2014.10); *B42D 25/48* (2014.10)

(58) Field of Classification Search
None
See application file for complete search history.

(56) References Cited

U.S. PATENT DOCUMENTS 4,133,926 A    1/1979    Vorrier et al.
4,343,851 A    8/1982    Sheptak
(Continued)

*Primary Examiner* — David R Dunn
*Assistant Examiner* — Christopher E Veraa
(74) *Attorney, Agent, or Firm* — Sand, Sebolt & Wernow Co., LPA

(57) ABSTRACT

The invention provides a free flowing copolymer between disparate plastic layers to thermally balance between the two differently expanding/contracting materials. The "primer" layer or "thermal balance layer" fully encapsulates the PET layer and can absorb the difference between the internal PET layer with any layer bonded to the encapsulated PET without cracking, bending or pitting and can "reset" into position when the heating/cooling has ended to make planar plastic core sheets for products such as credit cards, gift cards and the like.

20 Claims, 4 Drawing Sheets

(51) Int. Cl.
   *B42D 25/36*     (2014.01)
   *B42D 25/48*     (2014.01)

(56) References Cited

U.S. PATENT DOCUMENTS

| | | |
|---|---|---|
| 4,519,155 A | 5/1985 | Gallagher et al. |
| 4,522,428 A | 6/1985 | Small et al. |
| 5,145,548 A | 9/1992 | Yamamoto |
| 5,688,738 A | 11/1997 | Lu |
| 6,581,839 B1 | 6/2003 | Lasch et al. |
| 6,644,552 B1 | 11/2003 | Herslow |
| 9,623,699 B2 | 4/2017 | Ritter et al. |
| 9,731,480 B2 | 8/2017 | Bhattacharya et al. |
| 2009/0109035 A1* | 4/2009 | Subramanian ....... G08B 13/242 340/572.8 |
| 2015/0041545 A1 | 2/2015 | Martinez Mondejar et al. |
| 2015/0041546 A1 | 2/2015 | Herslow et al. |
| 2015/0266606 A1 | 9/2015 | Wiegers et al. |
| 2015/0290958 A1 | 10/2015 | Genet et al. |
| 2017/0120663 A1 | 5/2017 | Philippe et al. |

\* cited by examiner

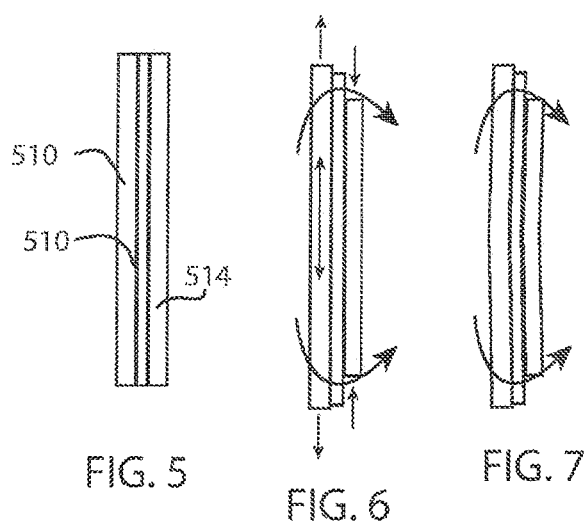

METHOD OF LAMINATING MULTI LAYER STRUCTURE TOGETHER IN A ROLL-TO-ROLL PROCESS TO MAKE A PRE-LAMINATION THAT MAY BE USED IN THE MAKING OF CREDIT AND GIFT CARDS AND MIRROR IMAGE VARIATIONS THEREOF

CROSS REFERENCE TO RELATED APPLICATIONS

This is a Continuation application which claims the benefit of U.S. application Ser. No. 15/597,952, filed on May 17, 2017, which is a non-provisional application of provisional patent application Ser. No. 62/483,490 filed on Apr. 10, 2017, and provisional patent application Ser. No. 62/337,756 filed on May 17, 2016; the disclosures of which are incorporated herein by reference.

TECHNICAL FIELD

The present application relates to a method of making credit cards, gift cards and the like.

BACKGROUND

Background Information

The current provision for creating the roll-to-roll lamination (PreLAM) consists of multiple layers designed for the manufacture of credit and gift cards among other types. The current market is being supplied by a PreLAM that limits the card manufacturer to use what is called a balanced (i.e., a front to back "Mirror Image") structure. This is the traditional method construction:

| |
|---|
| PVC ("polyvinyl chloride") front - clear |
| PVC core - printed front and back |
| PVC back sheet - clear |

Because there are currently multiple types of polymers used in order to incorporate holograms, silver mirror, among other special effects in the cards, the cards are built as shown below in a symmetrical design to prevent induction of manufacturing flaws:

Design A (Front of Card)

| |
|---|
| PVC - clear front cover |
| PET ("Polyethylene terephthalate") - decorative, metalized, hologram, etc.. over-printed front design |
| PVC - split core |

Design B (Back of Card)

| |
|---|
| PVC - split core |
| PET - clear over printed back design |
| PVC - clear bottom cover |

The two symmetric pieces are then assembled together (i.e., A+B) to make the card.

The current invention uses a different construction which was not previously possible to produce in a reliable, cost effective manner.

| |
|---|
| PVC - clear front sheet |
| copolymer |
| PET - decorative, metalized, hologram, etc.. over-printed front design |
| copolymer |
| PVC - split core |

This new design has shown through testing and qualification stage shows that there is no need to have a full "Design B," since the copolymer layer of the current invention allows for the PET and PVC ("polyvinyl chloride") layers to move independently (i.e., contract or expand independent of each other during heating and cooling) of each other during the thermal press process allowing for a more traditional method of just using the simplified construction for the back of the card:

| |
|---|
| PVC core - printed back design |
| PVC - clear bottom cover |

None of the previous inventions and patents, taken either singly or in combination, is seen to describe the instant invention as claimed.

SUMMARY

Accordingly, it is a principal object of a preferred embodiment of the invention to provide a design for a credit card, gift card of other multilayer product having two dissimilar materials bonded together.

It is another object of the invention to provide a card having a non-mirror image front to back construction by utilizing only a single PET layer sandwiched between two PVC layers.

It is a further object of the invention to utilize a copolymer such as a thermoplastic such as Ethylene Ethyl Acrylate Copolymer ("EEA") between two disparate layers to allow the layers to move independently of each other during production while still forming a planar/non-distorted card.

Still another object of the invention is to provide a flexible polymer between two adjacent layers to allow the polymer to prevent distortion between the two adjacent layers as they thermally expand or contract during production of a credit card, gift card or other object.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIGS. 5-7 show stresses and bending introduced by relative differences in parts of a product during processing.

Similar numbers refer to similar parts throughout the drawings.

DETAILED DESCRIPTION

Figure 1:
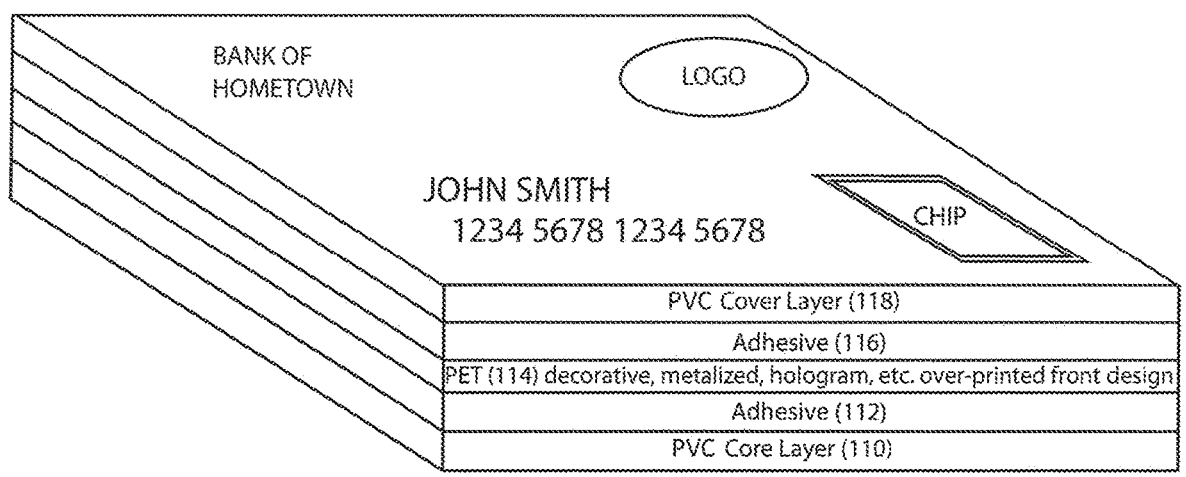
FIG. 1 is a diagrammatic view of a credit card according to the present invention.

The present invention is to a method of manufacturing using Dynamic Thermal Balancing (OTB) to produce a credit card, gift card, key card (collectively "magnetic stripe card" or "layered plastic card") or other layered plastic object. For simplicity, we will describe the construction of a single credit card, but one skilled in the art would recognize that the production process could be used to form other objects in a planar card shape or for use in building non-planar objects such as a plastic cup.

OTB is a technology that allows dissimilar material types to be thermally laminated together and maintain flatness, appearance, and functionality. It is based on the concept of matching the coefficient of thermal expansions (CTE) of the dissimilar materials with tie layers that can flow but stabilize giving the needed end properties and thereby significantly reduce the amount of rejected product.

Current credit cards are produced as the combination of a number of layers. Each layer has its own purpose, whether to provide support, protection or receive indicia or other components. Currently to maintain the credit card in a planar shape, each layer of the card needs to be symmetric to the other layers so that each layer expands or contracts identically with the other layers to prevent bending (see FIGS. 5-7) or pitting or other flaws that will result in a high rejection rate of the produced cards. When each layer is similar, there is less stress or relative movement between the layers, reducing errors in the cards. However, being limited to symmetric layers reduces the flexibility in constructing a card with the desired characteristics in the most efficient manner. For example, the current method may require additional non-essential layers in the card to ensure that each part of the card expands and contracts in conjunction with the others.

For example, current cards require the use of a matched front and back ("mirrored") structures to prevent "orange peel" (pitting or tiny cracking on the surface) but mainly to prevent the resulting product from becoming non-planar. If the two structures being joined in the hydraulic press are too dissimilar, they may expand and contract at different rates causing the two surfaces to destroy the desired flatness of the product. FIGS. 5-7 show an illustration of this concept where stresses and bending are introduced into a product by having a relative variation in expansion or contraction rates of different parts of a product.

In FIG. 5, the left structure 510 is joined to the right structure 514 by an adhesive 512 or the like in a hydraulic press or by similar method. If the left side expands relative to the right structure, this can cause bending stress or pitting of the surfaces. Since typically one of the right and left structure is transparent, this pitting may be visible and give an "orange peel" look to the product.

By providing a free flowing copolymer between the layers that can thermally balance between the two expanding/contracting materials, the "primer" layer or "thermal balance layer" can absorb the difference between the two without cracking, bending or pitting and can "reset" into position when the heating/cooling has ended. The thermal balance layer also physically isolate the layers from each other.

Currently, the market is being supplied by a PreLAM that limits the card manufacturer to use what is called a balanced (i.e., a front to back "Mirror Image") structure. Because there are currently multiple types of polymers used in order to incorporate holograms, silver mirror, among other special effects in the cards, the cards are built as shown below in a symmetrical design to prevent induction of manufacturing flaws and reduce the final product rejection rate:

Design A (Front of Card)

| PVC - clear front cover |
| --- |
| PET - decorative, metalized, hologram, etc., over-printed front design |
| PVC - split core |

Design B (Back of Card)

| PVC - split core |
| --- |
| PET - clear over printed back design |
| PVC - clear bottom cover |

The two symmetric pieces are then assembled together (i.e., A+B) to make the card.

The current invention uses a different construction which was not previously possible to produce in a reliable, cost effective manner. Instead of having a matched composite back and front structure, the present invention has a front, back and middle structure separate by a copolymer. See FIG. 1.

In process, a roll 10 of Polyethylene terephthalate ("PET") consists of the semicrystaline material. The material can be transparent of opaque and white depending on its structure and particle size. The roll has a decorative layer applied 12 to the PET. This can be metal, aluminum, a hologram, logo, brushed metal, vapor deposition metal layer, etc. The decorative layer can applied in a way (such as vapor deposition) in such an amount to appear as a complete metal layer, but with microscopic gaps to prevent the layer from blocking ("reflecting") the antenna from transmitting or receiving a signal through the metal layer ("attenuation of the antenna signal"). This increases the effective range of the card for use a proximity device instead of having to swipe or insert a chipped card having an antenna. Presently cards manufactured with a metal layer over the antenna suffer the drawback that the antenna signal is so attenuated that it cannot effectively be used as a proximity payment method.

Once the decorative layer is applied to the PET core, a Copolymer is applied 16 to one surface of the decorated PET core. This application is preferably achieved by an extrusion process, but is not limited to such. The copolymer is preferably Ethylene Ethyl Acrylate ("EEA") because it is a thermal plastic and is malleable enough to move and flow with different expansion and contraction rate products on either side of the EEA. The EEA acts as a primer or thermal barrier to provide a buffer between the plastics on either side of the EEA and not transfer any movement forces from one side to the other during heating or cooling of the product. This isolation of the two opposite sides of the EEA around the PET also prevents pitting by "filling in" any voids as the product cools again so that looking through a clear PVC section, no roughness is seen.

Preferably, the PET is encapsulated in two layers of EEA, each layer having a width of about 0.5 to 6 mm, and more preferably about 1 mm in thickness. EEA is a copolymer in a matrix of ethylene and is preferably provided as 15% EEA and 85% LOPE ("Low Density Polyethylene"). However, any copolymers of ethylene may be used. Additionally, other polyolefins may also be used such as polypropylene. Additionally, but less preferred, EAA ("Ethylene Acrylic Acid") or EVA ("d ethylene vinyl acetate") could be substituted in for the EEA. An important feature of the thermal barrier is that it bonds to polar substrates, to metals, to ester groups, to vinyl groups, etc. In this way, the PET layer could be different material such as metal that directly incorporates the decorative layer since the EEA will bond directly to metal.

After the EEA is applied, a cooling drum 18 cools the decorated PET structure. The process is then repeated by applying an EEA layer 20 to the opposite side of the PET structure and then cooling it with a cooling drum 22.

An adhesive layer 24 is then applied to the decorative structure. The decorative structure is then laminated 26 to a clear PVC layer through a laminating dip section and wound into a roll 28. This is the PreLAM roll that is supplied to a card manufacture. It is important to note that the use of EEA as the isolation layers allows the shipment of the PreLAM roll as a roll. Currently, the PreLAM must be sent as sheet to prevent the sheet from curling ("roll set") when ready to be cut into cards. The softer isolation layer allows the cards to more easily go from the roll form to the flat planar form required for the cards.

Figure 4:
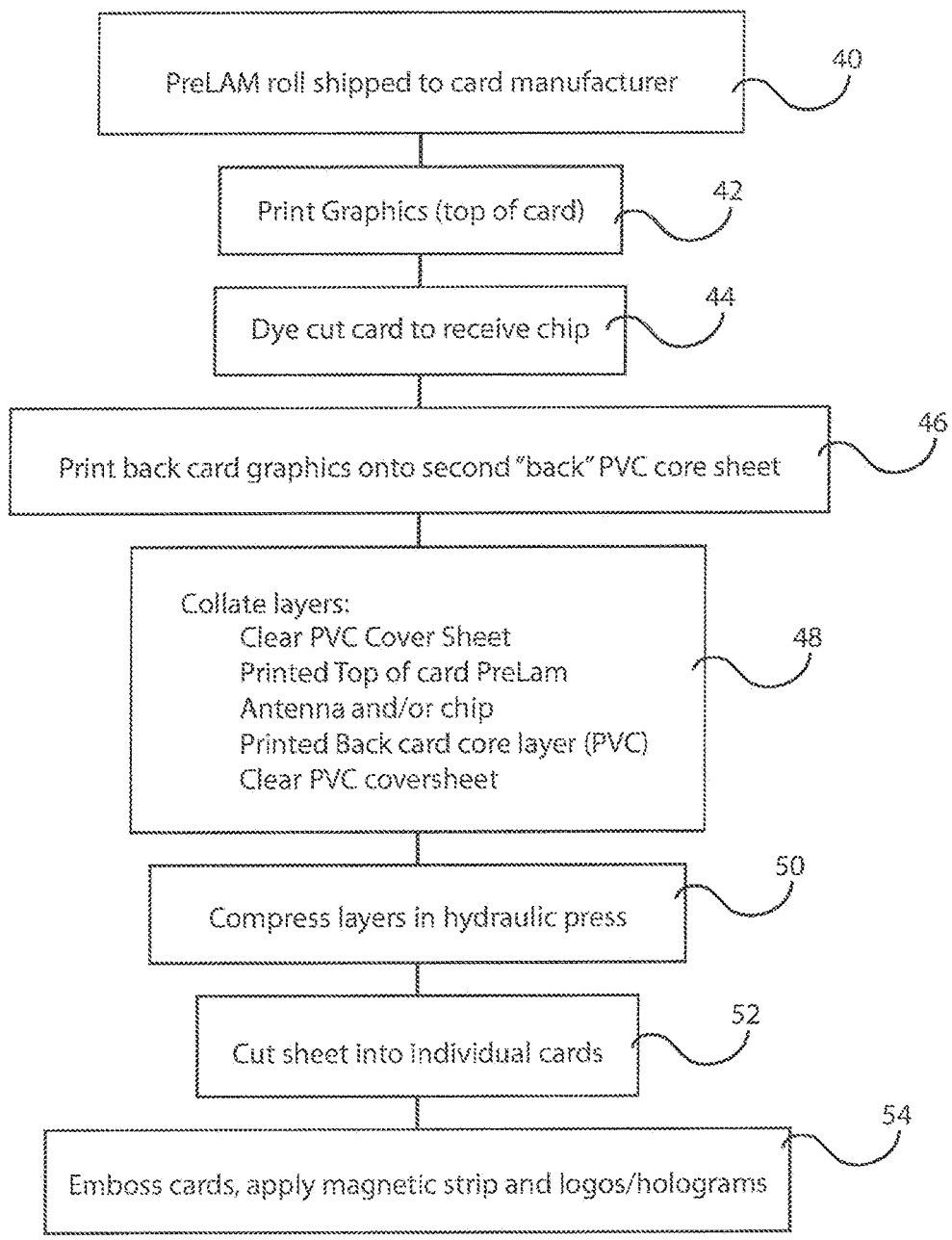
FIG. 4 is a flow diagram showing a process for further processing the product of the flow diagram of FIG. 3.

Referring now to FIG. 4, the PreLAM roll is shipped 40 to a card manufacture. This raw stock has the decorative layer and a clear PVC layer. It is ready to be individualized and cut into cards with the name of the cardholder, the number of the account, and banking information, etc.

To accomplish this, the graphics and text are printed to the top of the card 42. The card may then be dye cut to provide an area to receive a chip 44. The back of the card is then printed to a second "back" PVC core sheet 46.

The layers used in constructing the cards are then collated 48. This preferably includes a) a clear PVC cover sheet; b) a printed top of the card PreLAM; c) an antenna and/or chip; d) a printed card back core layer (PVC); and e) a clear PVC coversheet.

The layers are then compressed in a hydraulic press 50. Here the heat caused in the pressing causes the flow stabilizing copolymer such as EEA to act to isolate the printed back core layer and the PET decorated structure from each other so that the card remains planar ("flat") and the translucent layers are clear and unclouded. The thermoplastic copolymer serves this function as described above. The thermoplastic copolymer absorbs any relative changes of the PVC and PET layer and remains flat and intact after hydraulic pressing.

The cards are then cut into individual cards 52 and embossed to cause raised lettering or the like on the card with the name of the card holder and account numbers, etc. The card may also have a magnetic strip and any logs or holograms applied thereto.

This new design has been shown through testing and qualification stage shows that there is no need to have a full "Design B," since the copolymer layer of the current invention allows for the PET and PVC layers to move independently (i.e., contract or expand independent of each other during heating and cooling) of each other during the thermal press process allowing for a more traditional method of just using the simplified construction for the back of the card:

PVC core - printed back design
PVC - clear bottom cover

Figure 2:
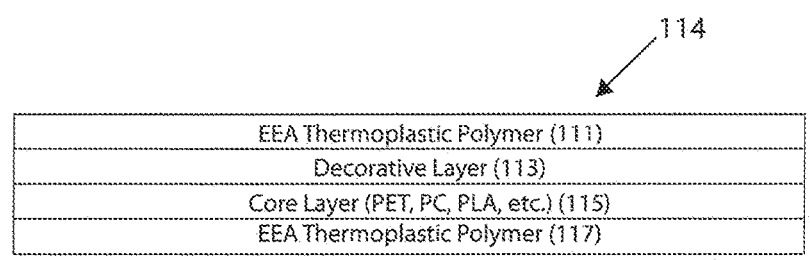
FIG. 2 is a diagrammatic view of the decorative structure of the credit card according to the present invention.
Figure 3:
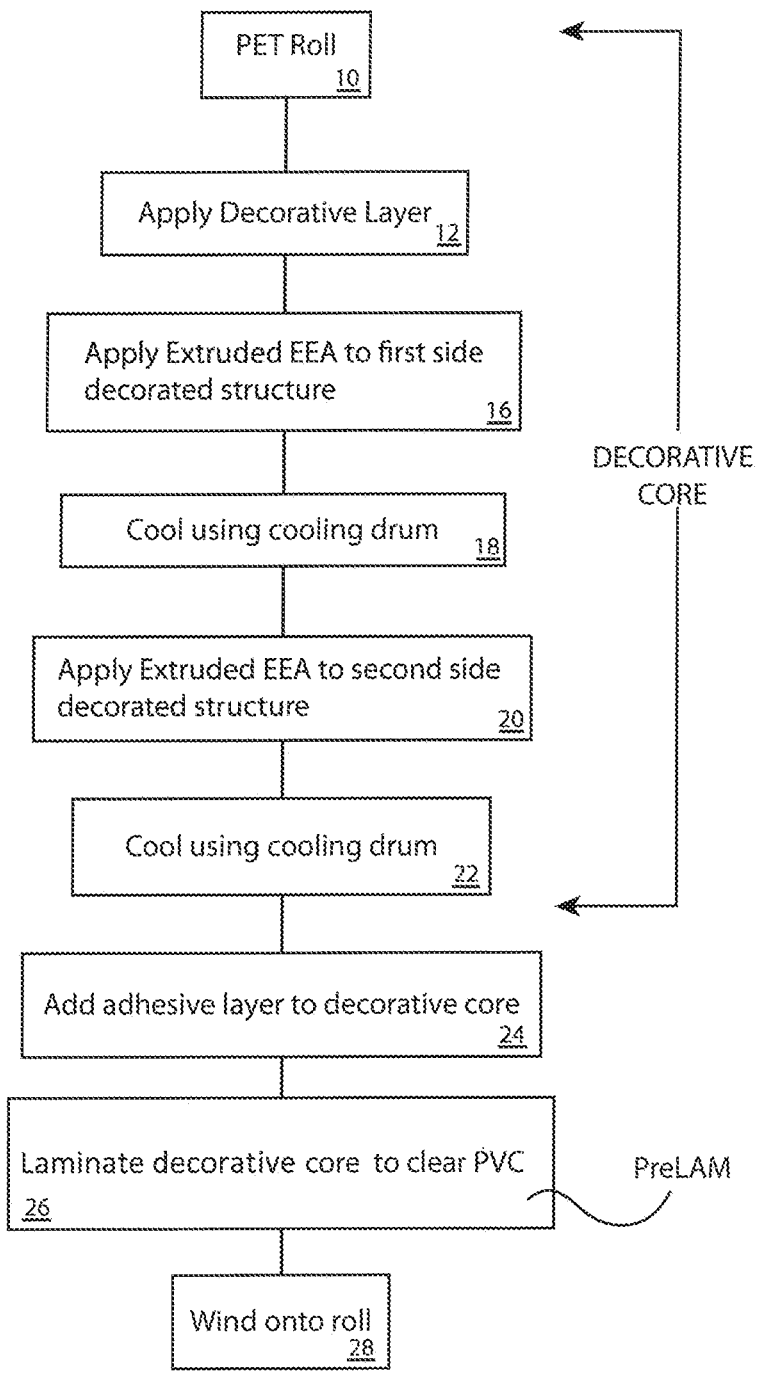
FIG. 3 is a flow diagram showing a process of making a product according to the present invention.

As shown in FIG. 2, the decorated PET layer 113, 115 (including any decoration) is fully encapsulated by the EEA thermal plastic barrier 111, 117. The EEA encapsulated decorative core 114 (FIG. 1) is then adhesively coated 112, 116 and laminated to one or more PVC layers 110, 118 to form the PreLAM. By fully isolating the PET in the ethylene copolymer, the variation in expansion and contraction of the PVC layer(s) and the PET is fully absorbed and compensated by the EEA isolating layers. This prevents the difference in the layers from exerting stresses or other forces on the PreLAM that would cause it to curl, pit or bend.

One skilled in the art would appreciate that the concept of a thermoplastic coplanar isolation layer between two dissimilar plastic layers could be used in the construction of objects other than cards. For example, the sheets could be rolled to make a tube or a cup, such as a printed logo cup for a football stadium cup with a team's logo, etc.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

What is claimed:

1. A method of making plastic sheets with two or more different layers comprising:

applying a decorative layer to a front side of a first sheet of material;

encapsulating the first sheet of material and the decorative layer between a first layer of a copolymer of ethylene and a second layer of a copolymer of ethylene to form an encapsulated decorative structure; wherein the first layer of the copolymer of ethylene is provided on a front of the decorative layer and defines a front side of the encapsulated decorative structure and the second layer of the copolymer of ethylene is provided on a back side of the first sheet of material and defines a back side of the encapsulated decorative structure;

cooling the first and second layers of copolymer of ethylene;

applying an adhesive layer to the front side and the back side of the encapsulated decorative structure; and laminating the encapsulated decorative structure through a laminating dip.

2. The method of claim 1 wherein the first sheet of material is made of polyethylene terephthalate (PET).

3. The method of claim 2 wherein the second sheet of material is made of polyvinyl chloride (PVC).

4. The method of claim 3 wherein the copolymer of ethylene is made of Ethylene Ethyl Acrylate Copolymer (EEA).

5. The method of claim 2 wherein laminating the encapsulated decorative structure further comprises:

laminating the encapsulated decorative structure to a clear PVC layer through the laminating dip.

6. The method of claim 5 further comprising:

winding the laminated encapsulated decorative structure into a roll; and shipping the laminated encapsulated decorative structure as a roll to a remote location.

7. A method of making plastic, multilayered cards from two or more different layers, comprising:

applying a decorative layer to a front side of a sheet of polyethylene terephthalate (PET);

encapsulating the sheet of PET and the decorative layer in between a first layer of a copolymer of ethylene on a front of the decorative layer and a second layer of a copolymer of ethylene on a back of the sheet of PET to form an encapsulated decorative structure;

laminating a clear layer of polyvinyl chloride (PVC) to the encapsulated decorative structure to define a PVC laminated encapsulated decorative structure;

adhering a first clear PVC cover sheet to the front of the PVC laminated encapsulated decorative structure;

adhering a card back core layer and second clear PVC cover sheet to the back of the PVC laminated encapsulated decorative structure; and hydraulically compressing the first clear PVC cover sheet, the PVC laminated encapsulated decorative structure, the card back core layer, and the second clear PVC cover sheet to bond them together into a bonded card stock; wherein at least one of the first and second layers of copolymer of ethylene thermally isolates the sheet of PET from any of the sheets of PVC during compression.

8. The method of claim 7 further comprising:

printing back of the card information on the card back core layer before adhering the card back core layer to the PVC laminated encapsulated decorative structure.

9. The method of claim 7 further comprising:

die-cutting a plurality of regions in the top surface; and inserting at least one of a proximity antenna and a card chip into the each die-cut region; wherein the die-cutting and inserting of the least one of a proximity antenna and a card chip are performed before adhering the card back core layer and second clear PVC cover sheet to the back of the PVC laminated encapsulated decorative structure.

10. The method of claim 9 wherein further comprising:

cutting the bonded card stock into individual cards, each card having a die-cut region containing the at least one of a proximity antenna and a card chip.

11. A layered plastic card comprising:

a first sheet of one of a metal and a plastic, the first sheet having a front and back;

a decorative layer applied to the front of the first sheet;

a first layer of a copolymer of ethylene applied over a front of the decorative layer and a second layer of a copolymer of ethylene applied over the back of the first sheet; wherein the first layer of copolymer of ethylene, the decorative layer, the first sheet, and the second layer of copolymer of ethylene together form a decorative core having a front and a back corresponding to the front and the back of the first sheet;

a first layer of plastic adhesively bonded to the front of the decorative core and thermally and physically isolated from the first sheet by the first layer of the copolymer of ethylene;

a second layer of plastic adhesively bonded to the back of the decorative core and thermally and physically isolated from the first sheet by the second layer of the copolymer of ethylene;

a card back core layer;

a first clear cover sheet; and a second clear cover sheet;

wherein the isolation of the first layer and the second layer of plastic from the first sheet prevents bending of the layered end product during heating and cooling of the first sheet and of the layer of plastic during manufacture of the layered end product due to relative contraction and expansion of the first sheet and the layer of plastic.

12. The layered plastic card of claim 11 wherein the card back core layer further comprises:

a layer of printing on a back side thereof between the card back core layer and the second clear cover sheet.

13. The layered plastic card of claim 12 further comprising:

a magnetic strip on the back side of the card back core layer.

14. The layered plastic card of claim 11 further comprising:

raised lettering on the layered plastic card.

15. The layered plastic card of claim 11 further comprising:

a credit card chip embedded into a die-cut region within the card.

16. The layered plastic card of claim 15 further comprising:

a proximity antenna embedded into the die-cut region and in communication with the credit card chip.

17. The layered plastic card of claim 11 wherein the copolymer of ethylene further comprises:

a thermoplastic Ethylene Ethyl Acrylate copolymer.

18. The layered plastic card of claim 11 wherein the first layer and the second layer of plastic are made of polyvinyl chloride (PVC).

19. The layered plastic card of claim 11 wherein the first clear cover sheet and the second clear cover sheet are made of PVC.

20. The layered plastic card of claim 11 wherein the first sheet is a sheet of polyethylene terephthalate (PET) and the decorative layer applied thereto includes at least a metal layer.

* * * * *